United States Patent
Bonner et al.

(10) Patent No.: US 10,064,479 B2
(45) Date of Patent: Sep. 4, 2018

(54) SCABBARD HOLDER FOR A HAND SAW

(71) Applicant: Sherrill, Inc., Greensboro, NC (US)

(72) Inventors: Nicholas Bonner, Pittsburgh, PA (US);
Cale Royer, Fort Wayne, IN (US);
Carson Royer, Indianapolis, IN (US);
Cornelius McDaid, Randolph, MA (US)

(73) Assignee: Sherrill, Inc., Greensboro, NC (US)

( * ) Notice: Subject to any disclaimer, the term of this patent is extended or adjusted under 35 U.S.C. 154(b) by 0 days.

(21) Appl. No.: 15/649,119

(22) Filed: Jul. 13, 2017

(65) Prior Publication Data

US 2018/0014629 A1 Jan. 18, 2018

Related U.S. Application Data

(60) Provisional application No. 62/361,570, filed on Jul. 13, 2016.

(51) Int. Cl.
*A45F 5/00* (2006.01)
*A01G 3/08* (2006.01)

(52) U.S. Cl.
CPC ............ *A45F 5/00* (2013.01); *A01G 3/083* (2013.01); *A45F 2005/008* (2013.01)

(58) Field of Classification Search
CPC ........ A45F 2005/008; A45F 2200/0575; A45F 5/14; B23Q 13/00; A63B 71/1225
USPC .................................................. 224/661, 222
See application file for complete search history.

(56) References Cited

U.S. PATENT DOCUMENTS

| | | | | |
|---|---|---|---|---|
| 4,953,767 A * | 9/1990 | Bennett | ............... | F41C 33/0227 224/192 |
| 5,941,435 A * | 8/1999 | Munro, III | ............... | A45F 5/14 224/222 |
| 6,217,072 B1 * | 4/2001 | Gregg | ............... | A45B 1/04 224/222 |
| 6,913,286 B2 * | 7/2005 | Kramer | ............... | B60R 7/14 211/64 |
| 2015/0108191 A1 * | 4/2015 | Velarde | ............... | F41C 33/046 224/576 |

OTHER PUBLICATIONS

Tree Surgery Training Darbyshire Sawpod—UK—Sawpod Throwpod; https://www.sawpod.co.uk/; 2 pages; retrieved Nov. 30, 2017.

* cited by examiner

*Primary Examiner* — Adam Waggenspack
(74) *Attorney, Agent, or Firm* — The Webb Law Firm

(57) ABSTRACT

A scabbard holder for securing a scabbard to a user's leg includes a hard shell configured to be secured to the scabbard, a cushioned pad connected to the hard shell, the cushioned pad being configured to be positioned between the hard shell and the user's leg, and a leg strap configured to secure the holder and the scabbard to the user's leg.

18 Claims, 10 Drawing Sheets

SCABBARD HOLDER FOR A HAND SAW

CROSS REFERENCE TO RELATED APPLICATION

The present application claims priority from U.S. Provisional Patent Application No. 62/361,570, filed on Jul. 13, 2016, which is hereby incorporated by reference in its entirety.

BACKGROUND OF THE INVENTION

Field of the Invention

The present disclosure relates to a holder device configured to securely attach the scabbard for a hand saw to a user's body, particularly a strap-secured holder for attaching the scabbard to a user's leg.

Description of Related Art

Arborists (i.e., tree workers) must often utilize hand-held pruning saws to cut branches, saplings, etc. These hand-held saws are generally lightweight, but are large enough to effectively cut through branches having a diameter of up to 8 inches or more. Various forms of hand-held pruning saws exist, including folding saws, curved-blade saws, straight-blade saws, etc., and each form of saw may have blades of varying length, depending upon the desired application. Regardless of the type of saw, they each comprise an elongated blade having numerous, extremely sharp teeth. Due to this sharpened blade, it is important for the pruning saw to include a covering for the blade when it is not in use. Folding saws utilize a portion of the saw's handle itself to form this covering, while curved-blade and straight-blade saws generally include a separate scabbard or sheath into which the blade may be inserted when the saw is not in use. By providing such a covering, the user is protected from potential injury and/or equipment damage.

Due to the nature of their work, arborists often prefer to use curved-blade or straight-blade saws as opposed to folding saws when pruning branches in trees. As the user is generally working from elevated heights within the tree via a complex climbing system utilizing ropes and rigging, the user may have only one free hand to access the saw for pruning. Folding saws generally require the use of two hands to safely open and close the saw, while curved-blade and straight-blade saws can be removed from and inserted into the scabbard or sheath with only one hand.

Conventionally, the scabbard or sheath is mounted to the user's belt, either via a belt loop on the scabbard itself, or a separate, removable loop that may be attached to the user's belt at one end and the scabbard at the other end. Referring to FIG. 1, such a known straight-blade saw and scabbard arrangement 100 is illustrated. Saw 102 comprises a blade portion 104 and a handle portion 106. A scabbard 108 comprises an elongated sheath 110 sized to accommodate the length of blade 104. The user may insert the blade 104 into an open first end 112 of scabbard 108 such that the sheath 110 covers and protects the sharpened blade 104. Scabbard 108 may be formed of any appropriate material, or combination of materials, such as plastic, metal, composites, etc. In the vicinity of the first end 112 may be a belt loop 116 and/or a belt attachment clip 114. Belt attachment clip 114 may be configured to connect to a separate loop (not shown) having a buckle at one end. The separate loop may then be attached to the user's belt or another object. Scabbard 108 further comprises a second end 118 opposite the first end 112. The distal end of scabbard 108 adjacent second end 118 (i.e., the end furthest from open first end 112) may also be open to allow debris, moisture, etc. to escape from within the scabbard 108. While scabbard 108 is shown having belt attachment clip 114 and belt loop 116, it is to be understood that scabbard 108 does not require such features and that no external attachment means may be provided on scabbard 108.

While the saw and scabbard arrangement 100 shown in FIG. 1 is effective in protecting the user and the user's equipment from the sharpened blade of the hand-held saw, the use of the belt-mount arrangement is often disadvantageous, particularly to arborists using ropes and other climbing systems to ascend trees. A belt-mounted scabbard will often become an obstruction as the user ascends and descends via ropes. Furthermore, due to the overall length of the blade, having the scabbard located at or near the user's waist makes withdrawing and inserting the blade into the scabbard cumbersome. That is, the user must reach awkwardly to insert or withdraw the saw, causing not only discomfort and/or inconvenience to the user, but also increasing the chance of injury and/or equipment or clothing damage.

In lieu of a belt-attached scabbard, arborists have found that having the scabbard attached to their leg (either their upper leg or lower leg) is preferable. Some solutions for attaching saw scabbards in this way have been contemplated, but these existing solutions generally lack durability for day-to-day use. Furthermore, the existing solutions are not generally customizable by the user to fit varying scabbard types and/or user preferences.

SUMMARY OF THE INVENTION

Accordingly, there is a need for a comfortable, customizable scabbard holder solution that enables a hand saw scabbard to be attached to the user's leg in accordance with their own personal preferences and dimensions. There is also a need for such a scabbard holder to be useable with various styles and sizes of scabbards, and at various locations along the scabbard.

In accordance with some examples of the disclosure, a scabbard holder is disclosed for securing a hand saw scabbard to a user's leg, wherein the holder comprises at least one holder portion secured at a first location along the scabbard. The at least one holder portion itself comprises both a hard shell portion and a cushioned pad portion adjacent the hard shell portion, wherein the cushioned pad portion is positioned on a side of the at least one holder portion facing the user's leg. The holder further comprises a first strap configured to secure the at least one holder portion and the scabbard to the user's leg.

In accordance with other examples of the disclosure, the first strap is formed of an elasticized material, and the first strap has at least one hook-and-loop surface thereon. Furthermore, the first strap is further configured to attach the hard shell portion and the cushioned pad portion. Each of the hard shell portion and the cushioned pad portion comprise a plurality of elongated strap openings formed therethrough. Additionally, the holder may comprise a second strap configured to secure the hard shell portion to the scabbard at the first location. The second strap may be formed of a rubber material, and the hard shell portion may comprise a pair of projections extending therefrom, the pair of projections configured to retain respective ends of the second strap.

In accordance with other examples of the disclosure, the cushioned pad portion may be formed of one of a single-density foam, a dual-density foam, and a triple-density foam, and the cushioned pad portion may be larger than the hard shell portion to which it is attached. Furthermore, the hard shell portion may be formed of one of a polyamide plastic, an ABS plastic, or another plastic. The scabbard holder may comprise two separate holder portions, wherein a first holder is secured at a first location along the scabbard and a second holder is secured at a second location along the scabbard different than the first location.

These and other features and characteristics of the present invention, as well as the methods of operation and functions of the related elements of structures, and the combination of parts and economies of manufacture will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
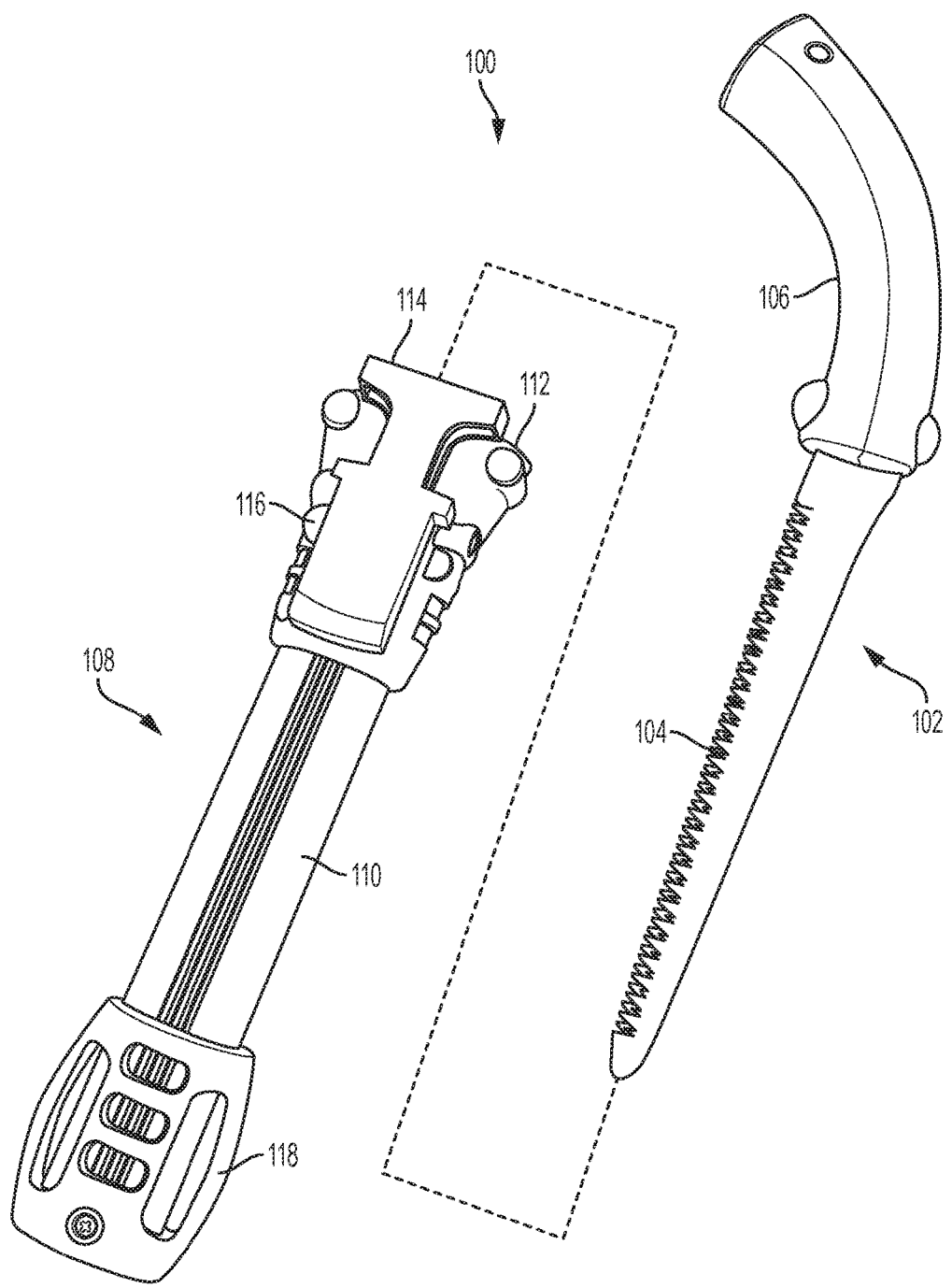
FIG. 1 is a side view of a hand-held saw and associated scabbard according to the prior art.
Figure 2:
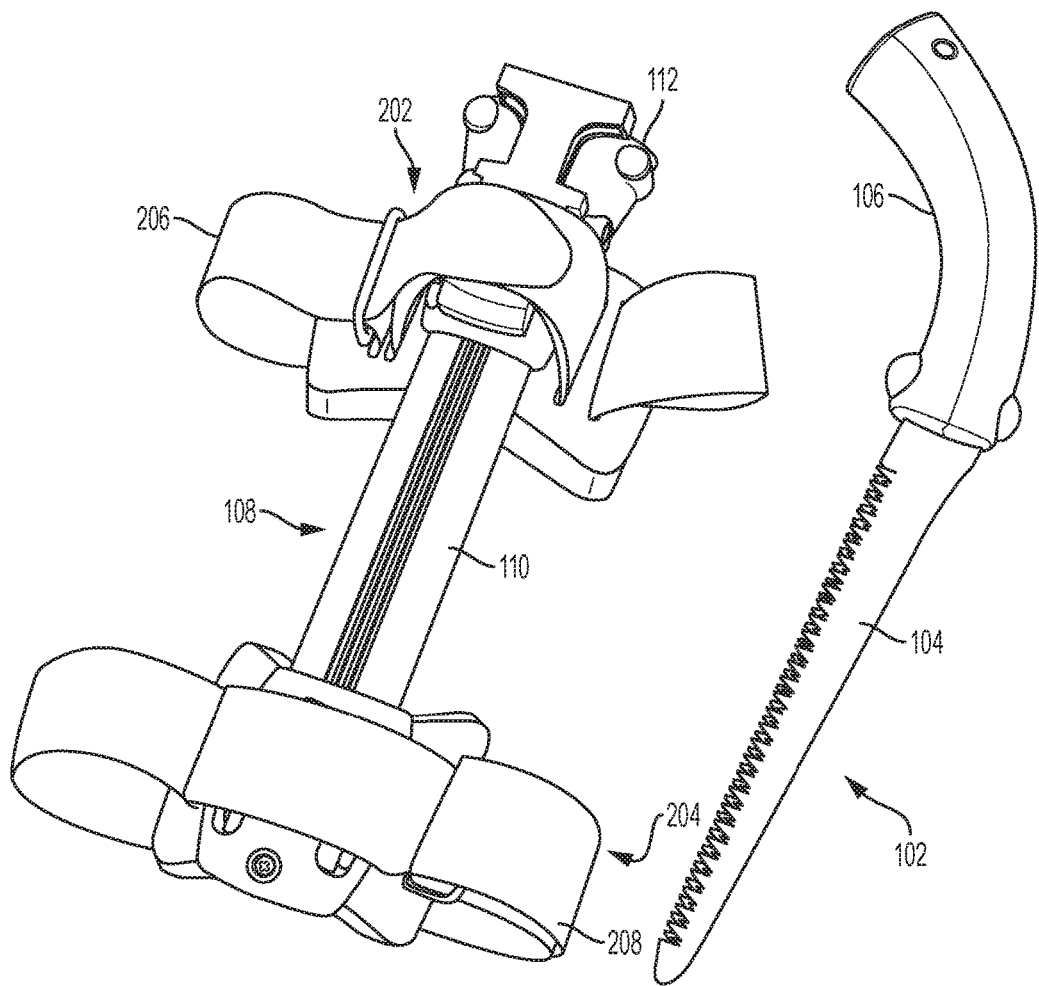
FIG. 2 is a side view of a hand-held saw, associated scabbard, and scabbard holder according to an example of the present disclosure.
Figure 3:
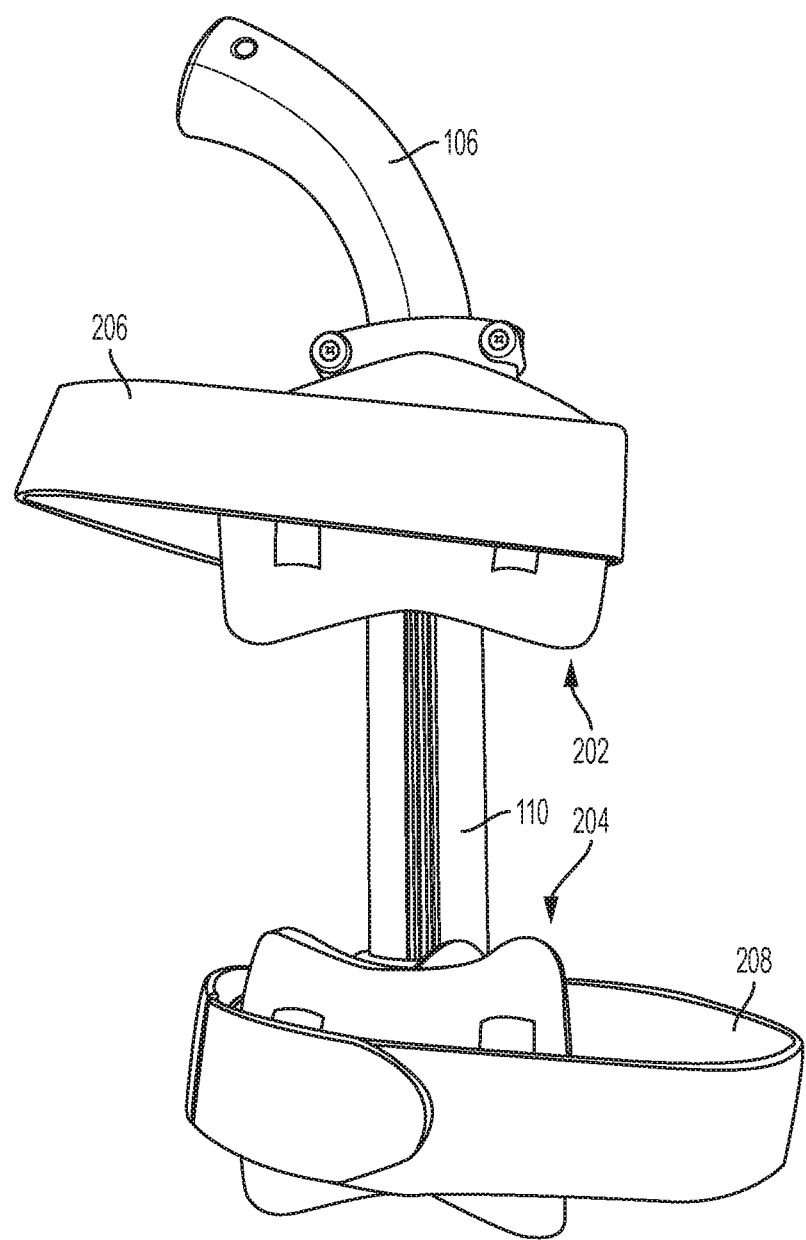
FIG. 3 is another side view of the hand-held saw, associated scabbard, and scabbard holder according to the example of FIG. 2.
Figure 4:
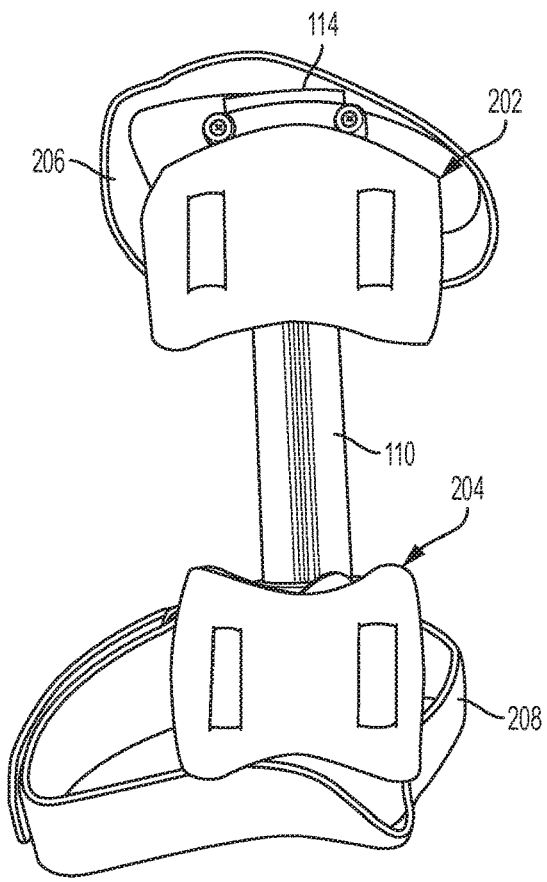
FIG. 4 is a side view of the scabbard holder of FIG. 2 disposed on a scabbard.
Figure 5:
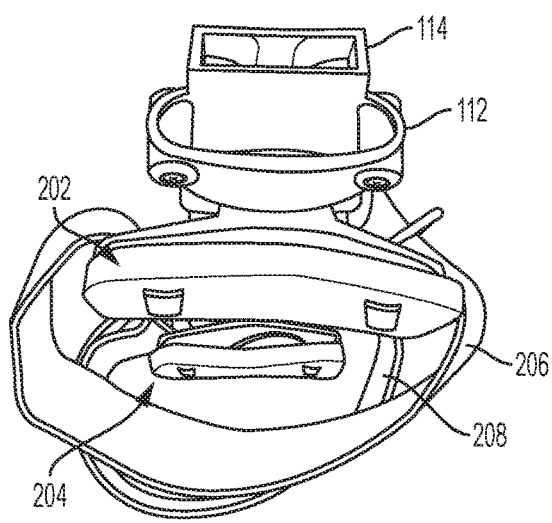
FIG. 5 is a top view of the scabbard and scabbard holder of FIG. 2 disposed on the scabbard.

For purposes of the description hereinafter, the terms "end", "upper", "lower", "right", "left", "vertical", "hori- zontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

Referring to FIGS. 2-5, various views of a saw scabbard holder configuration according to an example of the present disclosure are shown. The features of hand-held saw 102 and scabbard 108 shown and described above with respect to FIG. 1 are similarly shown, with common reference numerals, in FIGS. 2-5. As such, their functions will not be reiterated herein. FIGS. 2-5 show scabbard 108 having a respective first holder 202 and second holder 204 disposed at respective first and second locations on the scabbard 108 at or near respective ends of sheath 110. While shown in FIGS. 2-5 as being disposed at varying ends of sheath 110, it is to be understood that first holder 202 and second holder 204 may be coupled to scabbard 108 anywhere along its length. Furthermore, more or fewer than two holders may be utilized. For example, it is contemplated that the user could use only one holder (i.e., first holder 202), or they could utilize three, four, or more holders, dependent upon their needs and/or preferences.

Attached to first holder 202 and second holder 204 are a first leg strap 206 and second leg strap 208, respectively. Both the first leg strap 206 and the second leg strap 208 are preferably formed of an elasticized material that is attached to the respective first holder 202 and second holder 204 in such a way as to enable the user to attach the scabbard 108 to a portion of their leg using the first leg strap 206 and the second leg strap 208. The elasticized material making up the first leg strap 206 and the second leg strap 208 may further incorporate hook-and-loop surfaces thereon so as to enable the respective leg straps 206, 208 to be loosened or tightened based on the user's needs and preferences. The leg straps 206, 208 may also incorporate metal rings at the end thereof to allow for the straps 206, 208 to be looped back on themselves for fastening to the user's leg. Alternatively, other forms of adjusting the length of the leg straps 206, 208 are also contemplated, such as belt-style clasps, slides, cam buckles, etc.

Figure 6:
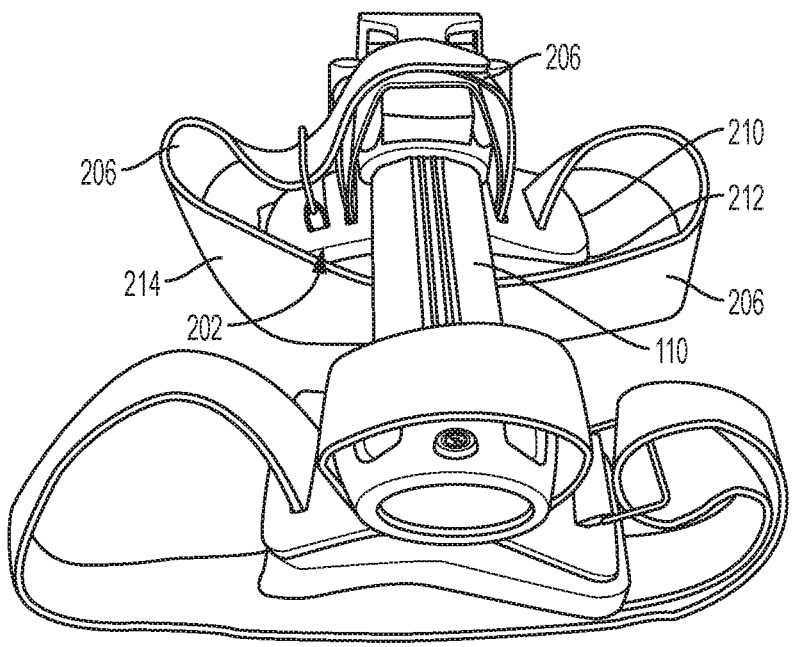
FIG. 6 is a bottom perspective view of the scabbard holder of FIG. 2 disposed on the scabbard.

Referring now to FIG. 6, in addition to attaching the scabbard 108 to the user's leg, leg straps 206, 208 are further utilized to attach a cushioned pad 212, 236 to a hard shell 210, 228 to form the respective first holder 202 and second holder 204. FIG. 6 specifically illustrates only the features of first holder 202, but it is to be understood that the features and construction of the second holder 204 (and any additional holder portions) would be similar. The first holder 202 comprises a cushioned pad 212 disposed adjacent to a hard shell 210. The hard shell 210 is configured to be secured to the scabbard 108. The cushioned pad 212 is connected to the hard shell 210 and is configured to be positioned between the hard shell 210 and the user's leg. The cushioned pad 212 may be, for example, a dual-density foam pad, but it is to be understood that the cushioned pad 212 could be formed of any appropriate cushioning material, such as a single-density foam or a triple-density foam. Additionally, the cushioned pad 212 could be formed of a non-foam material, such as rubber, fabric, etc. The hard shell 210, on the other hand, may be formed of any suitable hardened material, such as polyamide, acrylonitrile butadiene styrene (ABS) or other plastics, hardened rubber, aluminum, etc.

Figure 7A:
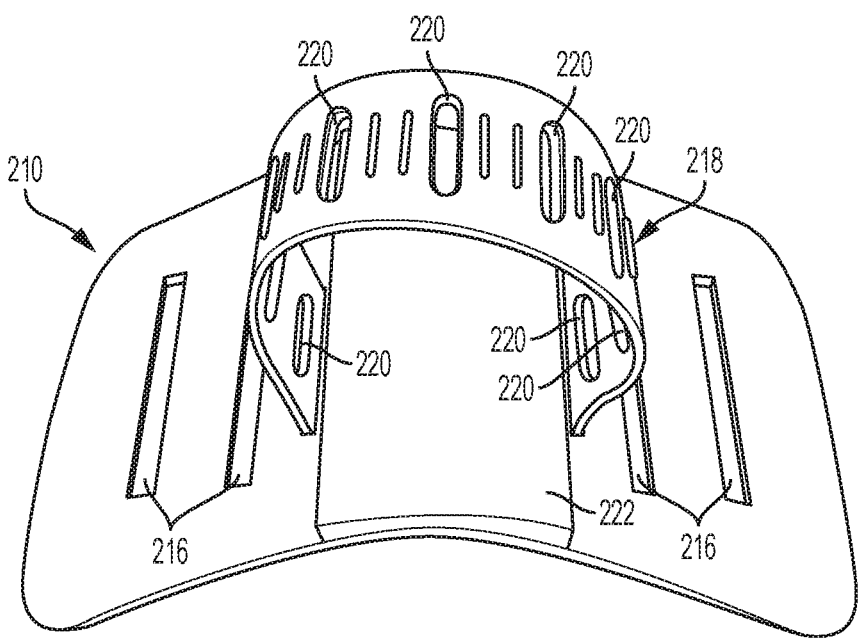
FIG. 7A is a front perspective view of a hard shell and strap of a scabbard holder according to an example of the present disclosure.

Referring still to FIG. 6, and also to FIGS. 7A-8B, the method of attaching the cushioned pad 212 to the hard shell 210 of the first holder 202 is disclosed. Preferably, the cushioned pad 212 is not affixed to hard shell 210 via any adhesive means such as glue, hook-and-loop surfaces, etc. Rather, the cushioned pad 212 is ideally attached to the hard shell 210 via the first leg strap 206, which is configured to be woven through corresponding elongated openings 216, 226 in both the cushioned pad 212 and the hard shell 210 in a fashion which adequately secures the cushioned pad 212 to the hard shell 210 such that the cushioned pad 212 does not slide or otherwise move during use. For example, as FIGS. 7A and 7B show, a plurality of elongated shell openings 216 sized to fit the first leg strap 206 therethrough may be formed through the hard shell 210. Corresponding elongated pad openings 226 in the cushioned pad 212 enable the user to weave the leg strap 206 through the respective hard shell 210 and cushioned pad 212 to securely attach the cushioned pad 212.

In particular, with reference to FIGS. 2-6, the first leg strap 206 includes a first end having a hook surface of a hook and loop fastener formed on a side thereof and a second end having a metal loop fastened thereto. The first end of the first leg strap 206 is woven through the elongated shell openings 216 in the hard shell 210 and the elongated pad openings 226 in the cushioned pad 212 to connect the cushioned pad 212 to the hard shell 210. The first leg strap 206 is looped around a holding strap 218 connected to a central portion of the hard shell 210, which will be described in additional detail below. To wear the first holder portion 202, the user may wrap the first leg strap 206 around their leg, pass the first leg strap 206 through the loop at the second end, and cinch the first leg strap 206 around the leg in a manner familiar to those having ordinary skill in the art. The hook surface formed at the first end can be fastened to the fabric of the first leg strap 206 at another location of the first leg strap 206, which may have a loop surface formed thereon. By avoiding the use of adhesives, the cushioned pad 212 can be easily removed for cleaning or replacement, and the pad 212 is less prone to shifting or damage. While such a method of attaching a cushioned pad to a hard shell is preferred, it is to be understood that the cushioned pad 212 could be attached to the hard shell 210 through the use of adhesives or other means of attachment, such as hook-and-loop surfaces, snap-on buttons, etc.

Figure 7B:
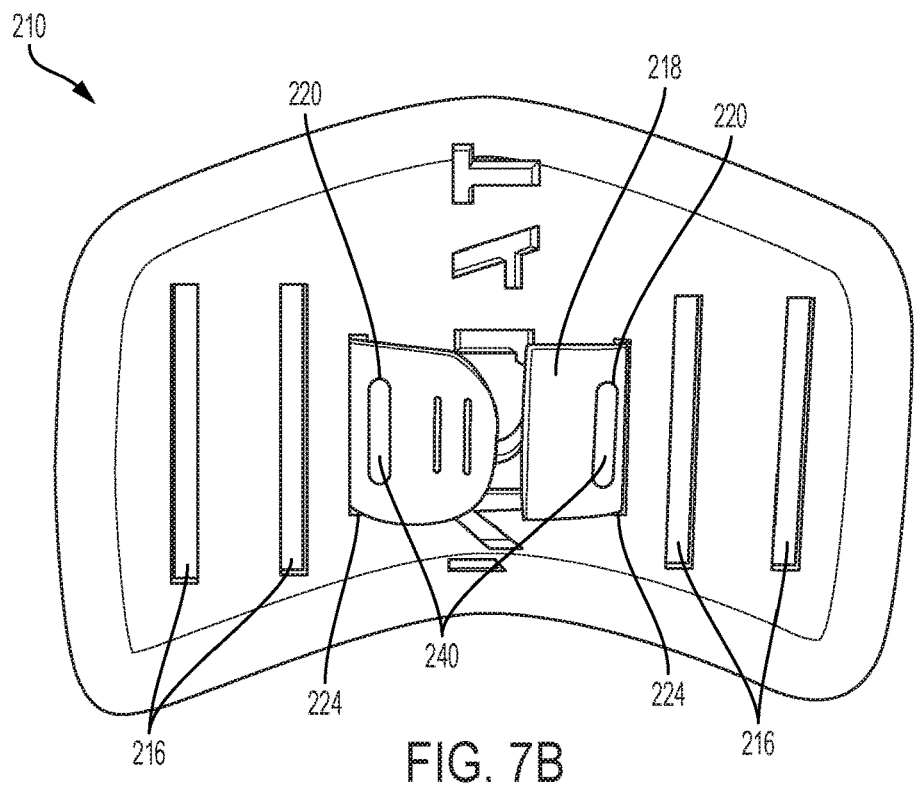
FIG. 7B is a rear perspective of the hard shell and strap of the scabbard holder of FIG. 7A.
Figure 8A:
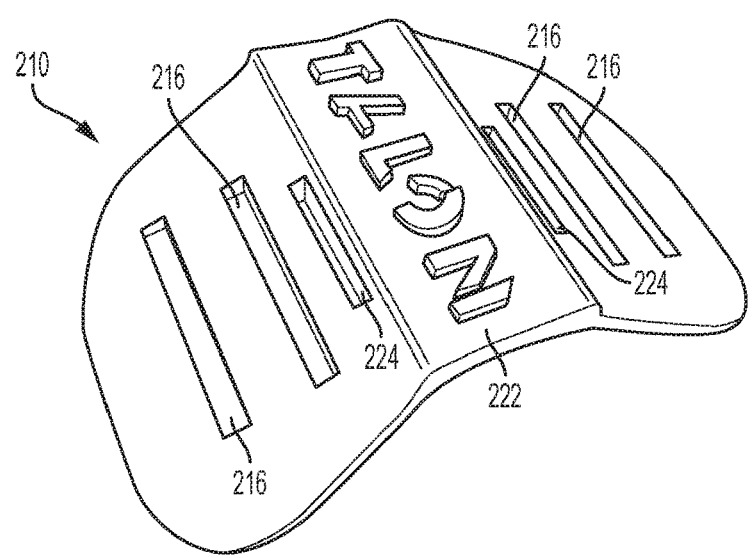
FIG. 8A is a perspective view of a first hard shell according to an example of the present disclosure.
Figure 11:
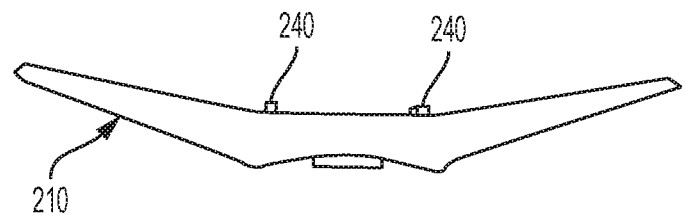
FIG. 11 is a top view of the first hard shell of FIG. 8A.
Figure 12:
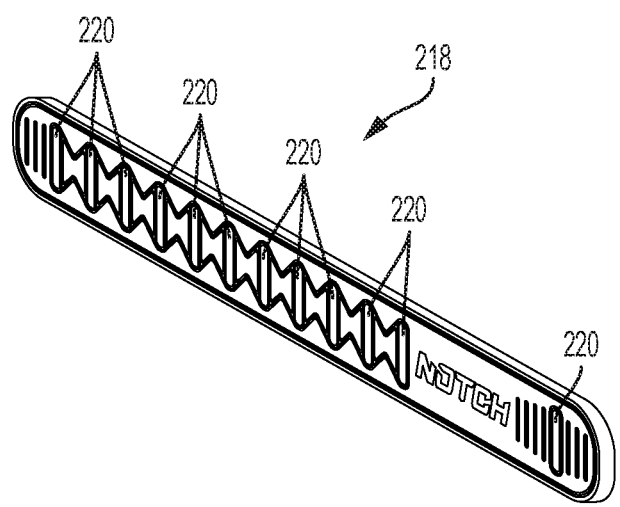
FIG. 12 is a view of a holding strap according to an example of the present disclosure.

FIGS. 7A, 7B, 11 and 12 further illustrate another aspect of the disclosure, wherein a holding strap 218 is attached at two ends thereof to the hard shell 210. The holding strap 218 is preferably an elastic rubber strap capable of attaching the hard shell 210 to a location along the length of the scabbard 108. The holding strap 218 may comprise a plurality of adjustment notches 220, which enable the length of the holding strap 218 to be adjusted so as to attain a tight grasp upon various surfaces of the scabbard 108. As shown in FIGS. 7B and 11, a pair of projections 240 extending from an inner surface of the hard shell 210. The adjustment notches 220 are sized so as to closely fit over projections 240. As shown in FIG. 8A, the hard shell 210 includes a pair of openings 224 formed therein configured to allow the holding strap 218 to extend through the hard shell 210 to engage the projections 240.

In order to adjust the fitting of the holding strap 218 onto the scabbard 108, the user simply need remove the holding strap 218 at one projection 240, pull the strap 218 to the desired tightness, and re-attach the holding strap 218 to the open projection 240 through a different adjustment notch 220 formed in the holding strap 218, thereby securing the hard shell 210 to the scabbard 108. As the holding strap 218 is preferably formed of elastic rubber, the hard shell 210 resists sliding along the chosen mounting point of the scabbard 108 when holding strap 218 is sufficiently tightened. Furthermore, with this configuration, the hard shell 210 may be mounted anywhere along the length of the scabbard 108, not solely at a fixed connection point (i.e., a belt loop) along the scabbard 108. Accordingly, the user may customize the mounting points for the first holder 202 depending upon their personal preferences or needs. Also, while the holding strap for connecting the second holder 204 to scabbard 108 is not illustrated, it is to be understood that the attachment method for attaching the second holder 204 to the scabbard 108 is substantially identical to that of the method of attaching the first holder 202. Alternatively, it is also envisioned that only one holding strap 218 could be utilized, with the second holder 204 being attached to the scabbard 108 merely by the elasticized leg strap 206. According to one example of the disclosure, the holding strap 218 is configured such that any excess length of the holding strap 218 can be removed after the holding strap 218 is secured around the scabbard 108 or equivalent structure.

Next, referring to FIGS. 8A-8B and FIGS. 9A-9B, detailed views of components of the respective first holder 202 and second holder 204 are illustrated. FIG. 8A shows the hard shell 210, which again comprises a plurality of elongated shell openings 216 through which the leg strap 206 may pass for attaching the hard shell 210 (and thus the first holder 202) to the user's leg. The hard shell 210 further comprises the pair of openings 224, which allow the holding strap 218 to pass therethrough, as described above. Furthermore, the hard shell 210 comprises a concave area 222 formed on an outer surface at a central portion thereof. The concave area 222 provides a location for the hard shell 210 to closely engage with a surface of the scabbard 108 such that the hard shell 210 does not shift, rock, or slide upon the scabbard 108.

Figure 8B:
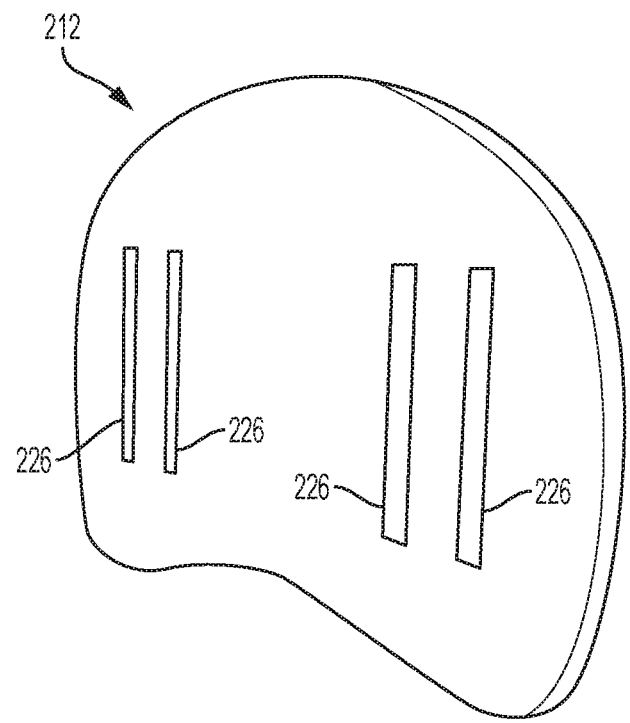
FIG. 8B is a perspective view of a first cushioned pad according to an example of the present disclosure.

FIG. 8B illustrates the further detail of the cushioned pad 212. The cushioned pad 212 comprises a plurality of elongated pad openings 226, which correspond to the locations of elongated shell openings 216 to allow the leg strap 206 to be woven therethrough so as to attach the cushioned pad 212 to the hard shell 210 without the use of adhesives or other attachment mechanisms.

Figure 9A:
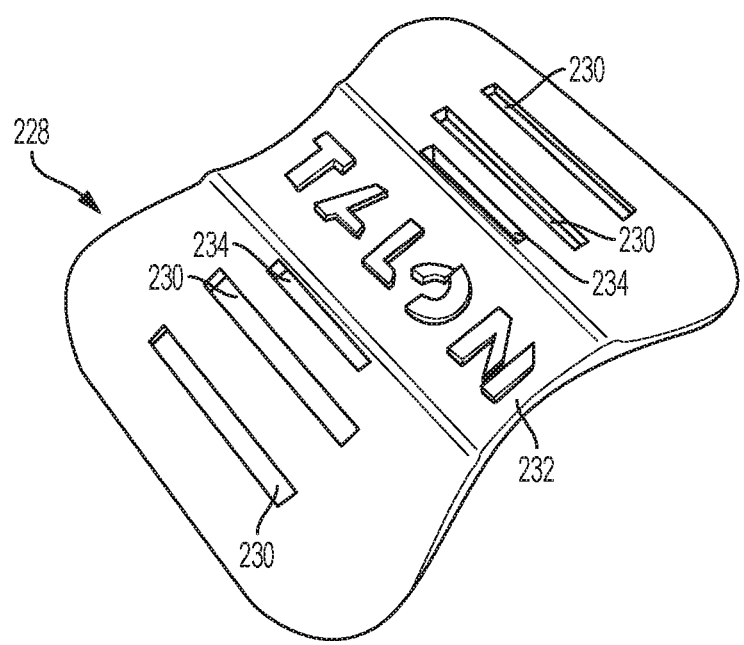
FIG. 9A is a perspective view of a second hard shell according to an example of the present disclosure.

Referring to FIG. 9A, a hard shell 228 of the second holder 204 is illustrated. Similar to the hard shell 210 discussed above, the hard shell 228 comprises a plurality of elongated shell openings 230 through which the second leg strap 208 may pass for attaching the hard shell 228 to the user's leg. The hard shell 228 further comprises a pair of openings 234, which allow a holding strap similar to holding strap 218 to pass therethrough. Furthermore, the hard shell 228 also comprises a concave area 232 formed on an outer surface at a central portion thereof. The concave area 232 provides a location for the hard shell 228 to closely engage with a surface of the scabbard 108 such that the hard shell 228 does not shift, rock, or slide upon the scabbard 108.

Figure 9B:
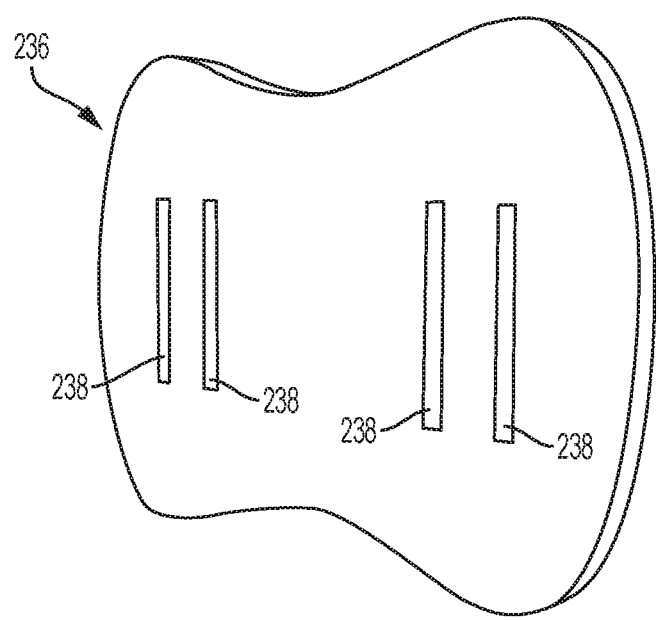
FIG. 9B is a perspective view of a second cushioned pad according to an example of the present disclosure.

FIG. 9B illustrates a cushioned pad 236 configured to be attached to the hard shell 228. The cushioned pad 236 comprises a plurality of elongated pad openings 238, which correspond to the locations of the elongated shell openings 230 of the hard shell 228. These corresponding openings allow the leg strap 208 to be woven therethrough to attach the cushioned pad 236 to the hard shell 228 without the use of adhesives or other attachment mechanisms, as was similarly described above with respect to the first holder 202. Alternatively, if the cushioned pad 236 (and/or the cushioned pad 212) are to be attached to the hard shell 228 through the use of adhesives or other attachment mechanisms such as buttons, snaps, etc., the elongated pad openings 238 (and/or the elongated pad openings 226) can be omitted from the cushioned pad design.

Figure 10:
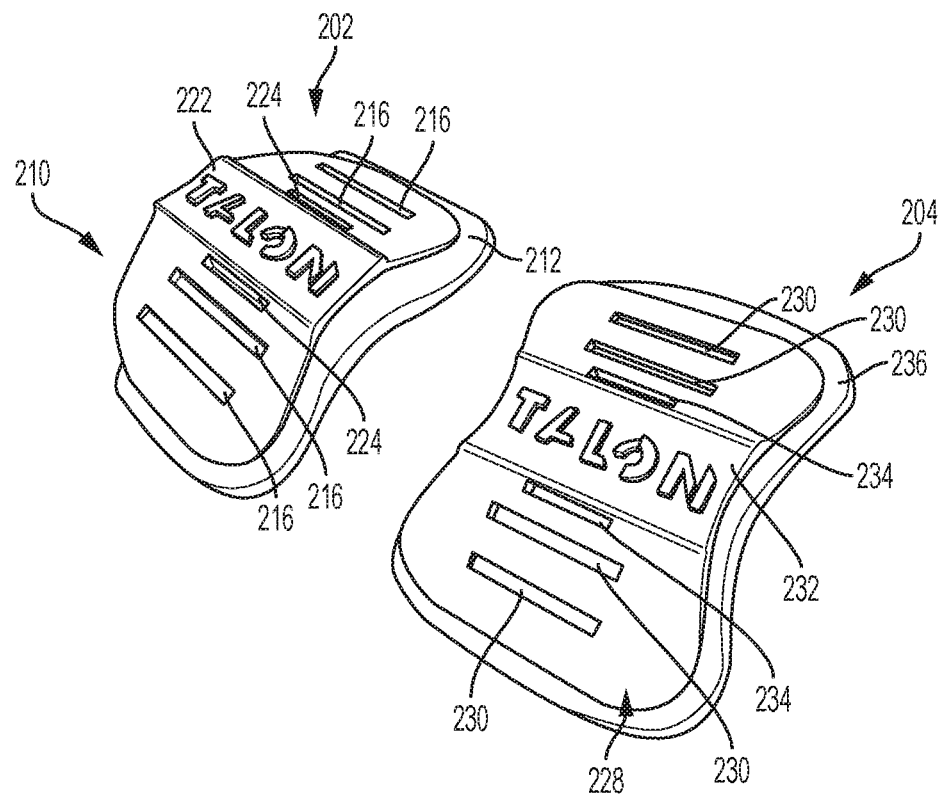
FIG. 10 is a perspective view of a hard shell and cushioned pad of a first holder and a hard shell and cushioned pad of a second scabbard holder according to an example of the present disclosure.

Referring now to FIG. 10, both the first holder 202 and the second holder 204 are illustrated. As is readily apparent in FIG. 10, the respective hard shells 210, 228 and cushioned pads 212, 236 of the first holder 202 and the second holder 204 are shaped differently, with the first holder 202 being substantially wing-shaped and the second holder 204 being substantially butterfly-shaped. These different shapes are designed to optimally fit the contours of different points on the user's leg. For instance, if the user were to attach the scabbard 108 using the first holder 202 and the second holder 204 at a section of their leg below the knee, the first holder 202 is sized and shaped so as to allow for movement of the user's knee without obstruction from the first holder 202, while the second holder 204 is sized and shaped so as to provide optimal contact between the cushioned pad 236 and the user's leg without providing discomfort. Furthermore, both the first hard shell 210 and the second hard shell 228 are shown as being concave in the direction in which the user's leg would contact the respective cushioned pads 212, 236. This concave shape enables the first holder 202 and the second holder 204 to comfortably secure the scabbard to the user's leg, while also helping to prevent radial or rotational movement of the scabbard when secured. Also, as shown, the cushioned pads 212, 236 of the first holder 202 and the second holder 204 are larger than the respective hard shells 210, 228 in order to effectively block contact between the hard shells 210, 228 and the user's leg. It is to be understood that the sizes and shapes of the first holder 202 and the second holder 204 are not limited to those shown, and any suitable size or shape may be appropriate depending on the mounting location and user preferences. It is also to be appreciated that the hard shells 210, 228 may have any configuration known to be suitable to those having ordinary skill in the art. In particular, the hard shells 210, 228 may be configured such that the respective central portion of the outer surface is formed flat and does not include the concave area 222, 232 described above.

An additional advantage to the first holder 202 and the second holder 204 being formed in different sizes and shapes is that the user is able to rotate and/or interchange the respective holders 202, 204 dependent upon their own comfort preferences. For example, one user could mount the first holder 202 to a bottom portion of the scabbard 108, while mounting the second holder 204 to a top portion of the scabbard 108. Another user could rotate the holder 202 a full 180° to better fit their leg anatomy. Thus, the placement of the holder portions along the scabbard is fully customizable by the user.

In an additional aspect of the present disclosure, utilizing the holders 202, 204 described above with respect to FIGS. 2-10 also enables the scabbard to be offset from the user's leg a certain distance, e.g., ¾ inch. This offset or displacement away from the user's leg adds additional safety and equipment protection, as the user is less likely to contact their leg, clothing, or equipment when removing or inserting the saw blade when the scabbard itself is offset from the surface of their leg.

Additionally, the holder portions, and specifically first holder 202, could be configured to provide an additional extension of material at or near the first end 112 of the scabbard 108. This extension of material would serve to provide additional protection to the user's leg and/or clothing as the user removes and/or inserts the saw blade into the scabbard.

Finally, while the preferred aspects of the disclosure discuss use of the one or more holder portions to secure hand-held saw scabbards to a user's leg, it is to be appreciated that the one or more holder portions described herein are equally applicable to other devices which can advantageously be strapped to a user's leg or other body part, such as gun holsters, tool carriers, etc. Again, the size, shape, and number of holder portions may be varied and/or customized based upon user preferences, device size/length, etc.

Further examples of the present disclosure will now be described in the following numbered clauses.

Clause 1: A scabbard holder (202, 204) for securing a scabbard (108) to a user's leg, the scabbard holder (202, 204) comprising: a hard shell (210, 228) configured to be secured to the scabbard (108); a cushioned pad (212, 236) connected to the hard shell (210, 228), the cushioned pad (212, 236) being configured to be positioned between the hard shell (210, 228) and the user's leg; and a leg strap (206, 208) configured to secure the holder (202, 204) and the scabbard (108) to the user's leg.

Clause 2: The scabbard holder (202, 204) according to clause 1, wherein the hard shell (210, 228) and the cushioned pad (212, 236) are connected by the leg strap (206, 208).

Clause 3: The scabbard holder according to clause 2, wherein the hard shell (210, 228) and the cushioned pad (212, 236) each comprise corresponding elongated openings (216, 226, 230, 238) configured to receive the leg strap (206, 208) such that the leg strap (206, 208) connects the hard shell (210, 228) and the cushioned pad (212, 236) by weaving between the elongated openings (216, 226, 230, 238).

Clause 4: The scabbard holder (202, 204) according to any one of clauses 1-3, further comprising a holding strap (218) adjustably connected to the hard shell (210, 228), the holding strap (218) being configured to secure the holder (202, 204) to the scabbard (108).

Clause 5: The scabbard holder (202, 204) according to clause 4, wherein the holding strap (218) comprises a plurality of adjustment notches (220) formed therein, wherein the hard shell (210, 228) comprises a plurality of projections (240) formed on an inner surface thereof and a pair of openings (224, 234) formed therein configured to allow the holding strap (218) to extend through the hard shell (210, 234), and wherein the holding strap (218) is adjustably connected to the hard shell (210, 228) by an engagement between at least two of the plurality of adjustment notches (220) of the holding strap (218) and the projections (240) of the hard shell (210, 228).

Clause 6: The scabbard holder (202, 204) according to any one of clauses 1-5, wherein the hard shell (210, 228) comprises a concave area (222, 232) formed on an outer surface thereof, the concave area (222, 232) being configured to engage the scabbard (108) to position the holder (202, 204) on the scabbard (108).

Clause 7: The scabbard holder (202, 204) according to any one of clauses 1-6, wherein the holder (202, 204) is configured to offset the scabbard (108) from the user's leg.

Clause 8: The scabbard holder (202, 204) according to any one of clauses 1-7, wherein the cushioned pad (212, 236) is larger than the hard shell (210, 228).

Clause 9: The scabbard holder (202) according to any one of clauses 1-8, wherein the hard shell (210) and the cushioned pad (212) are wing-shaped.

Clause 10: The scabbard holder (204) according to any one of clauses 1-8, wherein the hard shell (228) and the cushioned pad (236) are butterfly-shaped.

Clause 11: A scabbard holder arrangement for securing a scabbard (108) to a user's leg, the scabbard holder arrangement comprising: a first holder (202) configured to be secured to the scabbard (108) at a first location thereon and a second holder (204) configured to be secured to the scabbard (108) at a second location thereon, wherein each of the first holder (202) and the second holder (204) comprises: a hard shell (210, 228) configured to be secured to the scabbard (108); a cushioned pad (212, 236) connected to the hard shell (210, 228), the cushioned pad (212, 236) being configured to be positioned between the hard shell (210, 228) and the user's leg; and a leg strap (206, 208) configured to secure the respective holder (202, 204) and the scabbard (108) to the user's leg.

Clause 12: The scabbard holder arrangement according to clause 11, wherein for each of the first holder (202) and the second holder (204), the hard shell (210, 228) and the cushioned pad (212, 236) are connected by the leg strap (206, 208).

Clause 13: The scabbard holder arrangement according to clause 12, wherein for each of the first holder (202) and the second holder (204), the hard shell (210, 228) and the cushioned pad (212, 236) each comprise corresponding elongated openings (216, 226, 230, 238) configured to receive the leg strap (206, 208) such that the leg strap (206, 208) connects the hard shell (210, 228) and the cushioned pad (212, 236) by weaving between the elongated openings (216, 226, 230, 238).

Clause 14: The scabbard holder arrangement according to any one of clauses 11-13, wherein each of the first holder (202) and the second holder (204) further comprises a holding strap (218) adjustably connected to the respective hard shell (210, 228), the holding strap (218) being configured to secure the respective holder (202, 204) to the scabbard (108).

Clause 15: The scabbard holder arrangement according to clause 14, wherein each holding strap (218) comprises a plurality of adjustment notches (220) formed therein, wherein each hard shell (210, 228) comprises a plurality of projections (240) formed on an inner surface thereof and a pair of openings (224, 234) formed therein configured to allow the respective holding strap (218) to extend through the hard shell (210, 228), and wherein each holding strap (218) is adjustably connected to the respective hard shell (210, 228) by an engagement between at least two of the plurality of adjustment notches (220) of the holding strap (218) and the projections (240) of the respective hard shell (210, 228).

Clause 16: The scabbard holder arrangement according to any one of clauses 11-15, wherein each hard shell (210, 228) comprises a concave area (222, 232) formed on an outer surface thereof, the concave area (222, 232) being configured to engage the scabbard (108) to position the respective holder (202, 204) on the scabbard (108).

Clause 17: The scabbard holder arrangement according to any one of clauses 11-16, wherein the first holder (202) and the second holder (204) are configured to offset the scabbard (108) from the user's leg.

Clause 18: The scabbard holder arrangement according to any one of clauses 11-17, wherein for each of the first holder (202) and the second holder (204), the cushioned pad (212, 236) is larger than the hard shell (210, 228).

Clause 19: The scabbard holder arrangement according to any one of clauses 11-18, wherein the hard shell (210) and the cushioned pad (212) of the first holder (202) are wing-shaped, and the hard shell (228) and the cushioned pad (236) of the second holder (204) are butterfly-shaped.

Clause 20: A scabbard holder arrangement for securing a scabbard (108) to a user's leg, the scabbard holder arrangement comprising: a first holder (202) configured to be secured to the scabbard (108) at a first location thereon and a second holder (204) configured to be secured to the scabbard (108) at a second location thereon, wherein each of the first holder (202) and the second holder (204) comprises: a hard shell (210, 228) configured to be secured to the scabbard (108); a cushioned pad (212, 236) connected to the hard shell (210, 228), the cushioned pad (212, 236) being configured to be positioned between the hard shell (210, 228) and the user's leg; a leg strap (206, 208) configured to secure the respective holder (202, 204) and the scabbard (108) to the user's leg; and a holding strap (218) adjustably connected to the hard shell (210, 228), the holding strap (218) being configured to secure the respective holder (202, 204) to the scabbard (108), wherein for each of the first holder (202) and the second holder (204), the hard shell (210) and the cushioned pad (212) each comprise corresponding elongated openings (216, 226, 230, 238) configured to receive the respective leg strap (206, 208) such that the leg strap (206, 208) connects the hard shell (210, 228) and the cushioned pad (212, 236) by weaving between the elongated openings (216, 226, 230, 238), wherein for each of the first holder (202) and the second holder (204), the holding strap (218) comprises a plurality of adjustment notches (220) formed therein and the hard shell (210, 228) comprises a plurality of projections (240) formed on an inner surface thereof and a pair of openings (224, 234) formed therein configured to allow the respective holding strap (218) to extend through the hard shell (210, 228), the holding strap (218) being adjustably connected to the respective hard shell (210, 228) by an engagement between at least two of the plurality of adjustment notches (220) of the holding strap (218) and the projections (240) of the respective hard shell (210, 228), wherein for each of the first holder (202) and the second holder (204), the hard shell (210, 228) comprises a concave area (222, 232) formed on an outer surface thereof, the concave area (222, 232) being configured to engage the scabbard (108) to position the respective holder (202, 204) on the scabbard (108), and wherein the hard shell (210) and the cushioned pad (212) of the first holder (202) are wing-shaped, and the hard shell (228) and the cushioned pad (236) of the second holder (204) are butterfly-shaped.

It is to be understood that the invention may assume various alternative variations and step sequences, except where expressly specified to the contrary. It is also to be understood that the specific devices and processes illustrated in the attached drawings, and described in the specification, are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A scabbard holder for securing a scabbard to a user's leg, the scabbard holder comprising:
a hard shell configured to be secured to the scabbard;
a cushioned pad connected to the hard shell, the cushioned pad being configured to be positioned between the hard shell and the user's leg;
a holding strap adjustably connected to the hard shell, the holding strap being configured to secure the scabbard to the hard shell; and a leg strap extending through and around the hard shell and around the holding strap, the leg strap being configured to extend around the scabbard and the user's leg to secure the hard shell and the scabbard to the user's leg.

2. The scabbard holder according to claim 1, wherein the hard shell and the cushioned pad are connected by the leg strap.

3. The scabbard holder according to claim 2, wherein the hard shell and the cushioned pad each comprise corresponding elongated openings configured to receive the leg strap such that the leg strap connects the hard shell and the cushioned pad by weaving between the elongated openings.

4. The scabbard holder according to claim 1, wherein the holding strap comprises a plurality of adjustment notches formed therein,
wherein the hard shell comprises a plurality of projections formed on an inner surface thereof and a pair of openings formed therein configured to allow the holding strap to extend through the hard shell, and
wherein the holding strap is adjustably connected to the hard shell by an engagement between at least two of the plurality of adjustment notches of the holding strap and the projections of the hard shell.

5. The scabbard holder according to claim 1, wherein the hard shell comprises a concave area formed on an outer surface thereof, the concave area being configured to engage the scabbard to position the holder on the scabbard.

6. The scabbard holder according to claim 1, wherein the holder is configured to offset the scabbard from the user's leg.

7. The scabbard holder according to claim 1, wherein the cushioned pad is larger than the hard shell.

8. The scabbard holder according to claim 1, wherein the hard shell and the cushioned pad are wing-shaped.

9. The scabbard holder according to claim 1, wherein the hard shell and the cushioned pad are butterfly-shaped.

10. A scabbard holder arrangement for securing a scabbard to a user's leg, the scabbard holder arrangement comprising:
a first holder configured to be secured to the scabbard at a first location thereon and a second holder configured to be secured to the scabbard at a second location thereon, wherein each of the first holder and the second holder comprises:
a hard shell configured to be secured to the scabbard;
a cushioned pad connected to the hard shell, the cushioned pad being configured to be positioned between the hard shell and the user's leg;
a holding strap adjustably connected to the hard shell, the holding strap being configured to secure the scabbard to the hard shell; and a leg strap extending through and around the hard shell and around the holding strap, the leg strap being configured to extend around the scabbard and the user's leg to secure the hard shell and the scabbard to the user's leg.

11. The scabbard holder arrangement according to claim 10, wherein for each of the first holder and the second holder, the hard shell and the cushioned pad are connected by the leg strap.

12. The scabbard holder arrangement according to claim 11, wherein for each of the first holder and the second holder, the hard shell and the cushioned pad each comprise corresponding elongated openings configured to receive the leg strap such that the leg strap connects the hard shell and the cushioned pad by weaving between the elongated openings.

13. The scabbard holder arrangement according to claim 10, wherein each holding strap comprises a plurality of adjustment notches formed therein,
wherein each hard shell comprises a plurality of projections formed on an inner surface thereof and a pair of openings formed therein configured to allow the respective holding strap to extend through the hard shell, and
wherein each holding strap is adjustably connected to the respective hard shell by an engagement between at least two of the plurality of adjustment notches of the holding strap and the projections of the respective hard shell.

14. The scabbard holder arrangement according to claim 10, wherein each hard shell comprises a concave area formed on an outer surface thereof, the concave area being configured to engage the scabbard to position the respective holder on the scabbard.

15. The scabbard holder arrangement according to claim 10, wherein the first holder and the second holder are configured to offset the scabbard from the user's leg.

16. The scabbard holder arrangement according to claim 10, wherein for each of the first holder and the second holder, the cushioned pad is larger than the hard shell.

17. The scabbard holder arrangement according to claim 10, wherein the hard shell and the cushioned pad of the first holder are wing-shaped, and the hard shell and the cushioned pad of the second holder are butterfly-shaped.

18. A scabbard holder arrangement for securing a scabbard to a user's leg, the scabbard holder arrangement comprising:
a first holder configured to be secured to the scabbard at a first location thereon and a second holder configured to be secured to the scabbard at a second location thereon, wherein each of the first holder and the second holder comprises:
a hard shell configured to be secured to the scabbard;
a cushioned pad connected to the hard shell, the cushioned pad being configured to be positioned between the hard shell and the user's leg;
a leg strap configured to extend around the scabbard and a user's leg to secure the hard shell and the scabbard to the user's leg; and
a holding strap adjustably connected to the hard shell, the holding strap being configured to secure the respective holder to the scabbard,
wherein for each of the first holder and the second holder, the hard shell and the cushioned pad each comprise corresponding elongated openings configured to receive the respective leg strap such that the leg strap connects the hard shell and the cushioned pad by weaving between the elongated openings,
wherein for each of the first holder and the second holder, the holding strap comprises a plurality of adjustment notches formed therein and the hard shell comprises a plurality of projections formed on an inner surface thereof and a pair of openings formed therein configured to allow the respective holding strap to extend through the hard shell, the holding strap being adjustably connected to the respective hard shell by an engagement between at least two of the plurality of adjustment notches of the holding strap and the projections of the respective hard shell, wherein for each of the first holder and the second holder, the hard shell comprises a concave area formed on an outer surface thereof, the concave area being configured to engage the scabbard to position the respective holder on the scabbard, and wherein the hard shell and the cushioned pad of the first holder are wing-shaped, and the hard shell and the cushioned pad of the second holder are butterfly-shaped.

* * * * *